United States Patent
Liu et al.

(10) Patent No.: US 11,575,118 B2
(45) Date of Patent: Feb. 7, 2023

(54) CURRENT COLLECTOR AND ANODE ELECTRODE OF LITHIUM ION BATTERY, AND METHOD FOR FABRICATING THE SAME

(71) Applicants: Tsinghua University, Beijing (CN); HON HAI PRECISION INDUSTRY CO., LTD., New Taipei (TW)

(72) Inventors: Yuan-Feng Liu, Beijing (CN); Ze-Cheng Hou, Beijing (CN); Lu Chen, Beijing (CN); Lin Zhu, Beijing (CN); Wen-Zhen Li, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 88 days.

(21) Appl. No.: 16/391,745

(22) Filed: Apr. 23, 2019

(65) Prior Publication Data
US 2020/0280049 A1 Sep. 3, 2020

(30) Foreign Application Priority Data
Mar. 1, 2019 (CN) .......................... 201910157211.9

(51) Int. Cl.
H01M 4/1393 (2010.01)
H01M 10/0525 (2010.01)
(Continued)

(52) U.S. Cl.
CPC ......... *H01M 4/1393* (2013.01); *H01M 4/133* (2013.01); *H01M 4/134* (2013.01); *H01M 4/1395* (2013.01); *H01M 10/0525* (2013.01)

(58) Field of Classification Search
None
See application file for complete search history.

(56) References Cited

U.S. PATENT DOCUMENTS

| 2009/0081408 A1* | 3/2009 | Chan ................. C22C 23/00 428/109 |
| 2011/0129732 A1* | 6/2011 | Bachrach ........... H01M 4/525 429/231.95 |

(Continued)

FOREIGN PATENT DOCUMENTS

| CN | 107377618 | 11/2017 |
| CN | 108866412 | 11/2018 |
| TW | 201843869 | 12/2018 |

OTHER PUBLICATIONS

Yujun Shi, A self-supported, three-dimensional porous copper film as a current collector for advanced lithium metal batteries, Nov. 2018, Journal of Materials Chemistry A, 1092-1098 (Year: 2018).*

(Continued)

*Primary Examiner* — Haroon S. Sheikh
(74) *Attorney, Agent, or Firm* — ScienBiziP, P.C.

(57) ABSTRACT

A method for forming a current collector is provided. At least two carbon nanostructure reinforced copper composite substrates are provided. The at least two carbon nanostructure reinforced copper composite substrates are stacked to form a composite substrate. An active metal layer is disposed on a surface of the composite substrate to form a first a composite structure. The first composite structure is pressed to form a second composite structure. The second composite structure is annealed to form a third composite structure. The third composite structure is de-alloyed to form a porous copper composite.

9 Claims, 7 Drawing Sheets

(51) Int. Cl.
     *H01M 4/1395*     (2010.01)
     *H01M 4/134*      (2010.01)
     *H01M 4/133*      (2010.01)

(56) References Cited

U.S. PATENT DOCUMENTS

| | | | |
|---|---|---|---|
| 2016/0308218 A1* | 10/2016 | Ota | H01M 4/747 |
| 2018/0319664 A1* | 11/2018 | Fu | C25D 5/48 |
| 2018/0323437 A1 | 11/2018 | Fu et al. | |
| 2019/0203376 A1* | 7/2019 | Meng | C22C 3/00 |

OTHER PUBLICATIONS

Linglong Meng, Beyond the dimensional limitation in bio-inspired composite: Insertion of carbon nanotubes induced laminated Cu composite and the simultaneously enhanced strength and toughness, 2018, Carbon, 130, 222-232 (Year: 2018).*

Rajyashree Sundaram, COpper/carbon nanotube composites: research trends and outlook, 2018, Royal Society Open Science, 1-21 (Year: 2018).*

* cited by examiner

- S1: providing at least two carbon nanostructure reinforced copper composite substrates, and stacking the at least two carbon nanostructure reinforced copper composite substrates to form a composite substrate

- S2: disposing an active metal layer on a surface of the composite substrate to form a first a composite structure

- S3: pressing the first composite structure to form a second composite structure

- S4: annealing the second composite structure to form a third composite structure

- S5: dealloying the third composite structure to form a porous copper composite

CURRENT COLLECTOR AND ANODE ELECTRODE OF LITHIUM ION BATTERY, AND METHOD FOR FABRICATING THE SAME

CROSS-REFERENCE TO RELATED APPLICATIONS

This application claims all benefits accruing under 35 U.S.C. § 119 from China Patent Application No. 201910157211.9, filed on Mar. 1, 2019, in the China National Intellectual Property Administration, the contents of which are hereby incorporated by reference.

FIELD

The present disclosure relates to a current collector and an anode electrode, and a method for making the current collector and the anode electrode.

BACKGROUND

A lithium ion battery mainly consists of a cathode electrode, an anode electrode, an electrolyte and a separator. The conventional anode electrode is mainly composed of an active material, a conductive agent, a binder and a current collector. At present, a nanoporous metal structure is mainly used as the current collector. Although conventional nanoporous metals have present its advantages in using as current collector compared with conventional pure metal foils, efforts are still needed to meet the requirements of high energy density, high power density and high stability.

BRIEF DESCRIPTION OF THE DRAWINGS

Implementations of the present technology will now be described, by way of embodiments, with reference to the attached figures.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better.

Several definitions that apply throughout this disclosure will now be presented.

The term "comprise" or "comprising" when utilized, means "include or including, but not necessarily limited to"; it specifically indicates open-ended inclusion or membership in the so-described combination, group, series, and the like.

Figure 1:
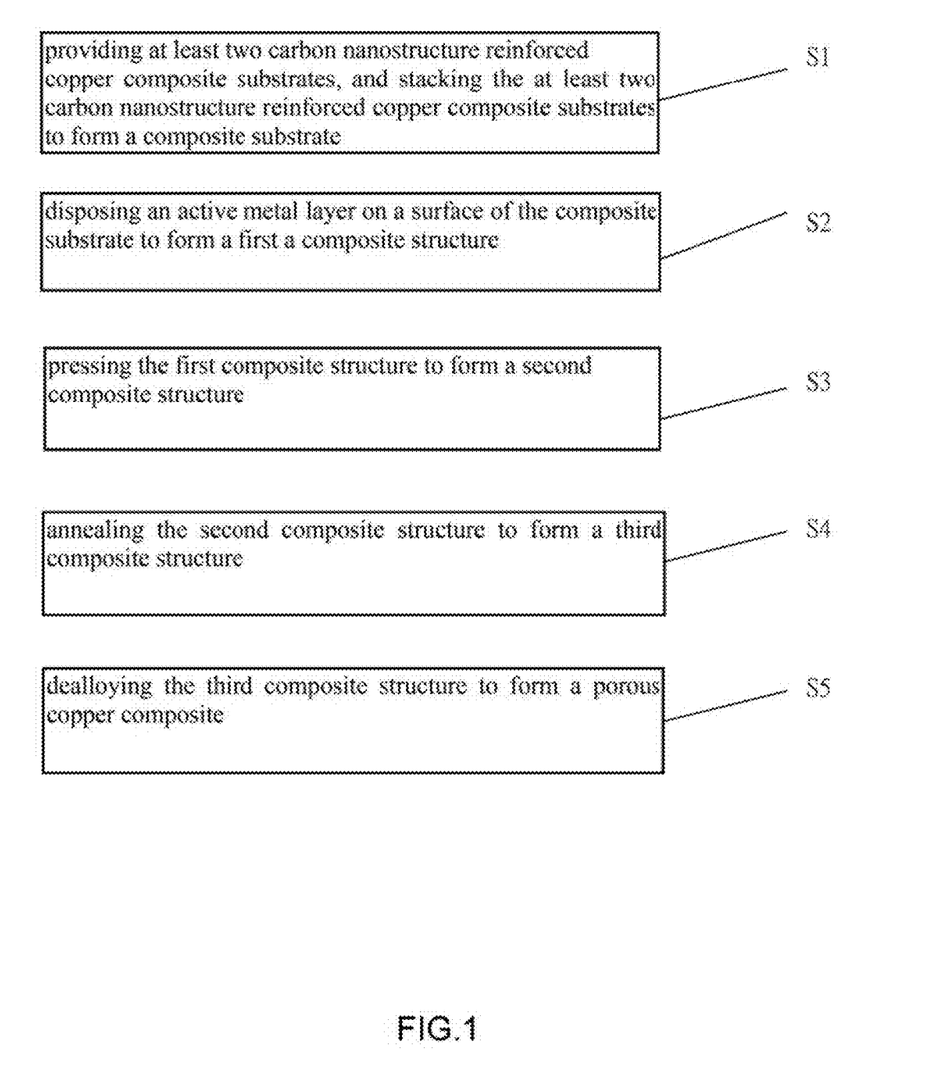
FIG. 1 is a flowchart of one embodiment of a method for making a current collector of a lithium ion battery.

Referring to FIG. 1, one embodiment is described in relation to a method for making a current collector of the lithium ion battery. The method comprises steps of:

step (S1), providing at least two carbon nanostructure reinforced copper composite substrates, and stacking the at least two carbon nanostructure reinforced copper composite substrates to form a composite substrate;

step (S2), disposing an active metal layer on a surface of the composite substrate to form a first a composite structure;

step (S3), pressing the first composite structure to form a second composite structure;

step (S4), annealing the second composite structure to form a third composite structure; and step (S5), dealloying the third composite structure to form a porous copper composite.

In step (S1), the carbon nanostructure reinforced copper composite substrate comprises a copper substrate and a carbon nanostructure. The carbon nanostructure is disposed on a surface of the copper substrate to form a carbon nanostructure reinforced copper composite substrate. In one embodiment, when the at least two carbon nanostructure reinforced copper composite substrates are stacked, the copper substrate are in contact with the carbon nanostructure. A layer number and a volume fraction of the carbon nanostructure in the composite substrate can be increased by stacking the at least two carbon nanostructure reinforced copper composite substrates to form the composite substrate. Thus, the volume fraction of the carbon nanostructure in the porous copper composite can be increased.

The copper substrate is a copper sheet. The copper sheet can be a copper sheet commercially available, or can be prepared as needed. A thickness of the copper sheet ranges from about 10 μm to about 1 cm. In one embodiment, the thickness of the copper sheet is about 25 μm.

The volume fraction of the carbon nanostructure in the composite substrate is greater than 0% and less than or equal to 70%. In one embodiment, the volume fraction of the carbon nanostructure in the first composite structure is ranged from about 30% to about 70%. The carbon nanostructure comprises at least one carbon nanotube film or at least one graphene film. The at least one carbon nanotube film or at least one graphene film is sequentially stacked on the surface of the copper substrate. When the carbon nanostructure comprises a plurality of carbon nanotube films, the adjacent two carbon nanotube films can be coplanar or stack on each other. Additionally, an angle can exist between the orientation of carbon nanotubes in adjacent carbon nanotube films, stacked and/or coplanar. Adjacent carbon nanotube films are combined solely by Van der Waals attractive forces therebetween, no external adhesive material is required. An angle between the aligned directions of the carbon nanotubes in the two adjacent carbon nanotube films can range from about 0 degrees to about 90 degrees. In one embodiment, the angle is 0°. When the carbon nanostructure comprises a plurality of graphene films, the adjacent two graphene films can be coplanar or stacked on each other.

The carbon nanotube film can be a carbon nanotube drawn film, a carbon nanotube rolled film, and a carbon nanotube flocculated film. In one embodiment, the carbon nanotube film is the carbon nanotube drawn film.

The carbon nanotube drawn film can be formed by the substeps of: (a) selecting one or more carbon nanotubes having a predetermined width from the super-aligned array of carbon nanotubes; and (b) pulling the carbon nanotubes to form carbon nanotube segments at a constant speed so that the carbon nanotubes are joined end to end to obtain a uniform carbon nanotube drawn film.

In step (a), the super-aligned array of carbon nanotube is grown on a growing substrate by chemical vapor deposition. The super-aligned array of carbon nanotube includes a plurality of carbon nanotubes. The carbon nanotubes in the super-aligned array of carbon nanotube are substantially parallel with each other and perpendicular to the growing substrate. The carbon nanotube segments having a predetermined width can be selected by using a tool such as an adhesive tape, a tweezers, or a clamp to contact the super-aligned array.

In step (b), the pulling direction is substantially perpendicular to the growing direction of the super-aligned array of carbon nanotubes. Each carbon nanotube segment includes a plurality of carbon nanotubes parallel to each other.

More specifically, during the pulling process, as the initial carbon nanotube segments are drawn out, other carbon nanotube segments are also drawn out end to end due to van der Waals attractive force between ends of adjacent segments. This process of drawing ensures a substantially continuous and uniform carbon nanotube film having a predetermined width can be formed. The carbon nanotube drawn film includes a plurality of carbon nanotubes joined ends to ends. The carbon nanotubes in the carbon nanotube drawn film are all substantially parallel to the pulling/drawing direction of the carbon nanotube drawn film, and the carbon nanotube drawn film produced in such manner can be selectively formed to have a predetermined width. The carbon nanotube drawn film formed by the pulling/drawing method as disclosed has superior uniformity in thickness and in conductivity over a typical disordered carbon nanotube film. Further, the pulling/drawing method is simple, fast, and suitable for industrial applications.

Figure 2:
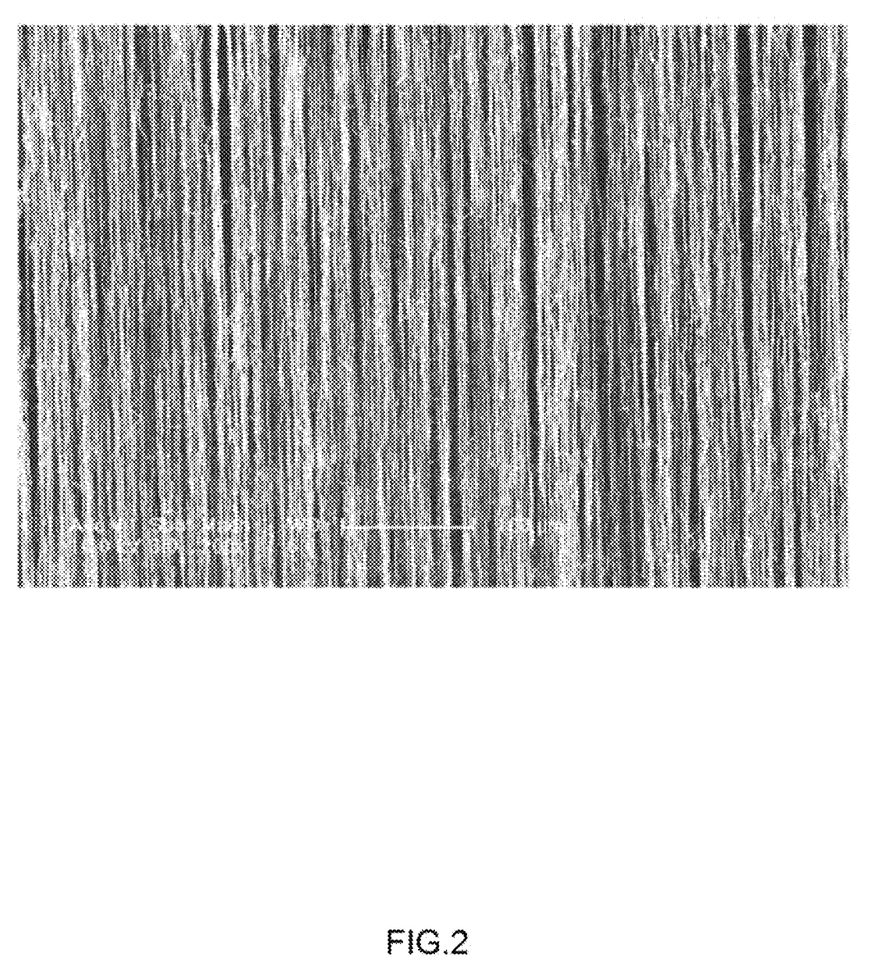
FIG. 2 is a scanning electron microscopy (SEM) of one embodiment of the carbon nanotube drawn film.

Referring to FIG. 2, the carbon nanotube drawn film includes a plurality of carbon nanotubes that can be arranged substantially parallel to a surface of the carbon nanotube drawn film. A large number of the carbon nanotubes in the carbon nanotube drawn film can be oriented along a preferred orientation, meaning that a large number of the carbon nanotubes in the carbon nanotube drawn film are arranged substantially along the same direction. An end of one carbon nanotube is joined to another end of an adjacent carbon nanotube arranged substantially along the same direction by Van der Waals attractive force. A small number of the carbon nanotubes are randomly arranged in the carbon nanotube drawn film, and has a small if not negligible effect on the larger number of the carbon nanotubes in the carbon nanotube drawn film arranged substantially along the same direction.

The carbon nanotube film is a free-standing structure. The term "free-standing structure" can be defined as a structure that does not have to be supported by a substrate. For example, a free standing structure can sustain the weight of itself when it is hoisted by a portion thereof without any significant damage to its structural integrity. So, if the carbon nanotube drawn film is placed between two separate supporters, a portion of the carbon nanotube drawn film, not in contact with the two supporters, would be suspended between the two supporters and yet maintain film structural integrity. The free-standing structure of the carbon nanotube drawn film is realized by the successive carbon nanotubes joined end to end by Van der Waals attractive force.

It can be appreciated that some variation can occur in the orientation of the carbon nanotubes in the carbon nanotube drawn film as can be seen in FIG. 2. Microscopically, the carbon nanotubes oriented substantially along the same direction may not be perfectly aligned in a straight line, and some curve portions may exist. It can be understood that some carbon nanotubes located substantially side by side and oriented along the same direction in contact with each other cannot be excluded.

Further, in step (S1), a titanium plate can be provided. A copper film is plated on the titanium plate, and the carbon nanostructure is disposed on the copper film, then another copper film is plated on the carbon nanostructure. The copper film and the carbon nanostructure are alternately disposed on the titanium plate substrate to form the composite substrate. In one embodiment, the subsequent steps (S2)-(S5) can be performed after the composite substrate is removed from the titanium plate substrate. In another embodiment, the active metal layer is disposed on the surface of the composite substrate and then the first composite structure is removed from the titanium plate substrate.

In one embodiment, before step (S2), further comprising a step of degreasing the copper substrate to improve bonding between the carbon nanostructure and the copper substrate. In one embodiment, the copper substrate is ultrasonically degreased in an organic solvent, and then the copper substrate is cleaned. The organic solvent can be acetone, or diethyl ether. The carbon nanostructure and the copper substrate can be cleaned by alcohol then by pure water after degreasing.

In one embodiment, the method further comprises a step of removing a metal oxide layer from surfaces of the copper substrate before the step of degreasing the copper substrate. In one embodiment, the copper substrate can be rubbed to remove the metal oxide layer from surfaces of the copper substrate. In one embodiment, the copper substrate can be cleaned by an acidic solution to remove the metal oxide layer from surfaces of the copper substrate. The acidic solution can be hydrochloric acid.

In step (S2), the active metal layer is formed by plating a salt solution of an active metal on the surface of the composite substrate to obtain the first composite structure. The active metal layer is a film structure formed by active metal atoms of the salt solution of the active metal. The active metal can be selected from potassium, calcium, sodium, magnesium, aluminum, zinc, iron, tin, and nickel. In the first composite structure, an atomic ratio of copper to the active metal is 2:8-8:2. During the plating process, the active metal atoms enter gaps between adjacent carbon nanotubes in the carbon nanotube film. In one embodiment, the salt solution of the active metal is a $ZnSO_4$ solution, and the active metal layer is a zinc film.

Further, before step S3, further comprising a step of washing and drying the first composite structure to remove a plating solution on the surface of the first composite structure. The first composite structure can be naturally dried or blow dried with nitrogen gas. In one embodiment, the plating solution on the surface of the first composite structure is washed with pure water, and then the surface of the first composite structure is blow dried with nitrogen gas.

In step (S3), a method of pressing the first composite structure is not limited as long as a thickness of the first composite structure is reduced. The thickness of the first composite structure can be pressed by a rolling mill at room temperature. In one embodiment, the thickness of the second composite structure is less than or equal to 70% of the thickness of the first composite structure. In another embodiment, a pressure is applied to upper and lower surfaces of the first composite structure by the roll mill at room temperature, and the resulting thickness of the second composite structure is about half of the thickness of the first composite structure.

During the pressing of the first composite structure, some cracks may be formed on the edges of the first composite structure due to continuous deformation of the first composite structure. In order to avoid the chipping of the first composite structure in the subsequent pressing which will affect the performance of the composite, trimming off the edges of the first composite structure may be performed after step (S3), before step (S4.

In one embodiment, in the process of pressing the first composite structure to form the second composite structure, when the thickness of the second composite structure is compressed to half of the thickness of the first composite structure, the edges of the second composite structure is trimmed by 1 mm to remove the cracks.

In step (S3), further comprising a process of alternatively folding and pressing the second composite structure. The process of alternatively folding and pressing the second composite structure comprises: folding the first composite structure to form a folded composite structure, and then pressing the folded composite structure. The term "the folding and pressing process" when utilized, means "the process of alternatively folding and pressing the first composite structure". A method of folding the first composite structure is not limited. In one embodiment, the first composite structure is folded in half, and the thickness is doubled. In another embodiment, in order to avoid forming the chipping of the composite structure in the subsequent pressing which will affect the properties of the porous copper composite, the cracks at the edge of the formed composite structure can be trimmed off after each the folding and pressing process.

In one embodiment, in each the folding and pressing process, a thickness of the first composite structure after pressing is decreased to less than 70% of a thickness of the first composite structure after folding. In another embodiment, in each the folding and pressing process, a thickness of the first composite structure after pressing is decreased to less than 50% of a thickness of the first composite structure after folding. In one embodiment, the folding and pressing process is repeated more than two times. In one embodiment, the folding and pressing process is repeated 2~16 times. In one embodiment, the folding and pressing process is repeated 4~12 times. The number of the folding and pressing process depends on the thickness of the first composite structure, and comprehensive properties of the porous copper composite as required. The comprehensive properties of the porous copper composite refer to strength, hardness, porosity ratio and electrical conductivity of the porous copper composite. The carbon nanostructures can be uniformly dispersed in the porous copper composite by controlling the number of pressing times.

Compared with the first composite structure without the pressing treatment, the second composite structure obtained after the pressing treatment is dense, and no delamination occurs. A plurality of carbon nanostructures can be stacked in the first composite structure. Thus, the volume fraction of the carbon nanostructure in the porous copper composite is improved. When the plurality of carbon nanostructures are disposed between the copper substrate and the active metal layer, and the first composite structure is not pressed, the plurality of carbon nanostructures are prone to delamination in the subsequent dealloying process to form the porous copper composite. Therefore, step (S3) can not only improve the compactness of the second composite structure, but also avoid the delamination of the subsequently formed porous copper composite. The carbon nanostructure can be uniformly dispersed in the porous copper composite material, and the volume fraction of the carbon nanostructure can be increased in the porous copper composite by step (S3).

In step (S4), annealing the second composite structure at a high temperature to form a third composite structure. The annealing process of the second composite structure can be in a vacuum condition. The annealing process of the second composite structure comprises steps: (a) heating the second composite structure at a high temperature so that atoms of the copper substrate and the active metal layer can be sufficiently thermally diffused; (b) annealing and cooling the second composite structure, wherein the active metal atoms and the copper atoms form an alloy. Different metals have different annealing temperatures. A sufficient diffusion between atoms of substrate and atoms of the active metal can be achieved by controlling the annealing temperature. During the annealing process, since the metal is directly grown on surfaces of the plurality of carbon nanotubes, therefore, a contact resistance between the plurality of carbon nanotubes and the metal is reduced. The resulting second composite structure has a better conductivity than the first composite structure. An interface between the plurality of carbon nanotubes and the metal is a coherent or semi-coherent interface. The annealing temperature is higher than 300° C., and an annealing time ranges from about 12 hours to about 72 hours. In one embodiment, the second composite structure is annealed at a temperature 500° C. for 24 hours, and Zn atoms and Cu atoms are sufficiently diffused to form the alloy with homogenous composition.

The alloy in the third composite structure not only coats on the surface of the carbon nanotube film, but also are located in the gaps between two adjacent carbon nanotubes in the carbon nanotube film, and further coats on a node between the adjacent two carbon nanotubes along a same direction. An end of one carbon nanotube is joined to another end of an adjacent carbon nanotube arranged substantially along the same direction by Van der Waals attractive force.

In step (S5), dealloying the third composite structure to remove the active metal to form a porous structure, thereby obtaining the porous copper composite. A method of dealloying the third composite structure can be a chemical method or an electrochemical method. In one embodiment, the third composite structure can be placed in a dilute acid or a dilute alkali solution, the plurality of active metal atoms in the third composite structure chemically react or electrochemically react with the dilute acid or the dilute alkali. The active metal atoms in the third composite structure are completely reacted to form a porous structure. In another embodiment, the third composite structure is de-alloyed by electrochemical method. An efficiency of electrochemical dealloying is higher than that of chemical dealloying. The porous copper composite with different morphologies can be easily obtained by controlling the voltage in electrochemical corrosion. The porous copper composite comprises a plurality of pores. Pore diameters of the porous copper composite range from about 30 nm to about 5 µm. The carbon nanotubes are uniformly dispersed in the porous copper composite. The volume fraction of the carbon nanotube in the porous copper composite is greater than 0% and less than or equal to 70%. The volume fraction of the at least one carbon nanometer structure in the porous copper composite can be obtained by adjusting a content of the at least one carbon nanostructure in the first composite structure.

Figure 3:
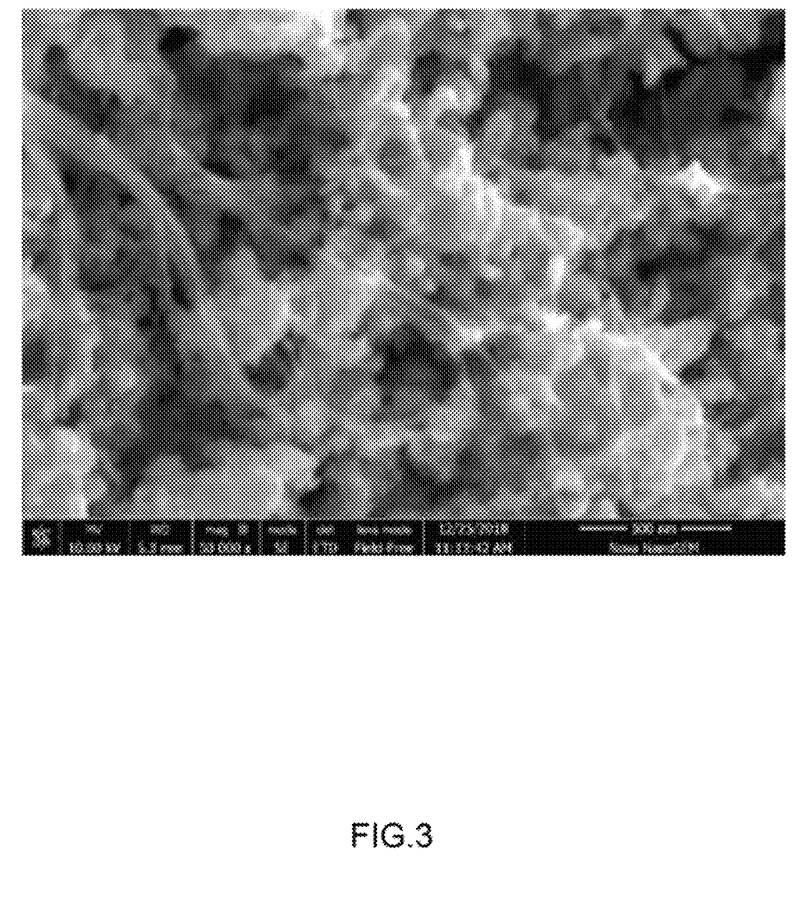
FIG. 3 is a SEM image of one embodiment of the porous copper composite.
Figure 4:
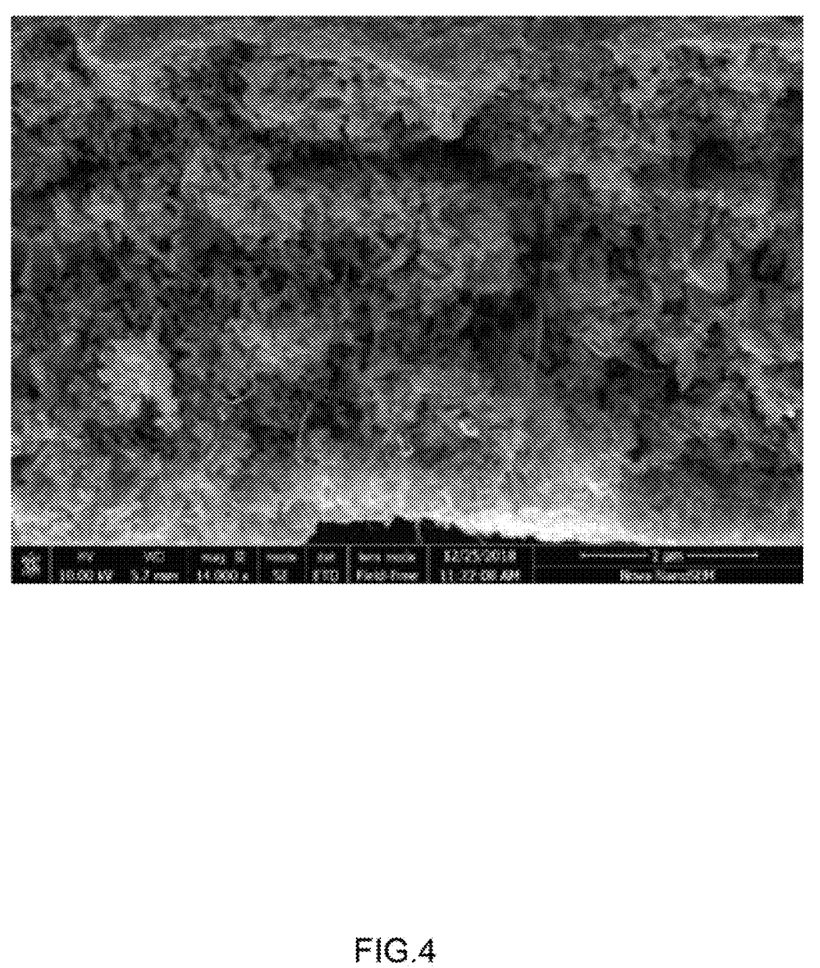
FIG. 4 is a SEM image of one embodiment of the porous copper composite.

Referring to FIG. 3 and FIG. 4, one embodiment of a porous copper composite prepared by the above method for making the porous copper composite is provided. The porous copper composite comprises a plurality of copper ligaments and at least one carbon nanostructure. A porous structure is formed by the plurality of copper ligaments, and the at least one carbon nanostructure is uniformly disposed in the plurality of copper ligaments. The volume fraction of the at least one carbon nanostructure in the porous copper composite is greater than 0% and less than or equal to 70%.

The porous copper composite has a three-dimensional network structure. The porous structure comprises a plurality of pores formed between the plurality of copper ligaments staggered with each other. The plurality of pores can be uniformly dispersed or randomly dispersed. Sizes of the pores range from about 30 nanometers to about 5 micrometers. The method of forming the plurality of pores is not limited.

The volume fraction of the at least one carbon nanostructure in the porous copper composite is greater than 0% and less than or equal to 70%. In one embodiment, the volume fraction of the at least one carbon nanostructure in the porous copper composite is greater than 30% and less than or equal to 70%. In another embodiment, the volume fraction of the at least one carbon nanostructure in the porous copper composite is greater than 40%.

The carbon nanostructure comprises at least one carbon nanotube film or at least one graphene film. When the carbon nanostructure comprises a plurality of carbon nanotube films, the adjacent two carbon nanotube films can be coplanar or stacked on each other. Additionally, an angle can exist between the orientation of carbon nanotubes in adjacent drawn films, stacked and/or coplanar. Adjacent drawn carbon nanotube films are combined solely by Van der Waals attractive forces therebetween, without external adhesive. An angle between the aligned directions of the carbon nanotubes in the two adjacent drawn carbon nanotube films can range from about 0 degrees to about 90 degrees. In one embodiment, the angle α is 0°. When the carbon nanostructure comprises a plurality of graphene films, the adjacent two graphene films can be disposed in a coplanar or stacked.

The carbon nanotube film can be a carbon nanotube drawn film, a carbon nanotube rolled film, and a carbon nanotube flocculated film. The at least one carbon nanotube film are embedded in the porous structure. One part of the carbon nanotubes in the carbon nanotube film are embedded in the plurality of the coper ligaments, and another part of the carbon nanotubes in the carbon nanotube film are located in the plurality of pores, and/or the others part of the carbon nanotubes in the carbon nanotube film are exposed from surface of the porous structure. In one embodiment, the carbon nanotube film is the carbon nanotube drawn film.

The carbon nanotube drawn film includes a plurality of carbon nanotubes that can be arranged substantially parallel to a surface of the carbon nanotube drawn film. A large number of the carbon nanotubes in the carbon nanotube drawn film can be oriented along a preferred orientation, meaning that a large number of the carbon nanotubes in the carbon nanotube drawn film are arranged substantially along the same direction. An end of one carbon nanotube is joined to another end of an adjacent carbon nanotube arranged substantially along the same direction by Van der Waals attractive force. A small number of the carbon nanotubes are randomly arranged in the carbon nanotube drawn film, and has a small if not negligible effect on the larger number of the carbon nanotubes in the carbon nanotube drawn film arranged substantially along the same direction.

The carbon nanotube film is a free-standing structure. The term "free-standing structure" can be defined as a structure that does not have to be supported by a substrate. For example, a free standing structure can sustain the weight of itself when it is hoisted by a portion thereof without any significant damage to its structural integrity. So, if the carbon nanotube drawn film is placed between two separate supporters, a portion of the carbon nanotube drawn film, not in contact with the two supporters, would be suspended between the two supporters and yet maintain film structural integrity. The free-standing structure of the carbon nanotube drawn film is realized by the successive carbon nanotubes joined end to end by Van der Waals attractive force.

In one embodiment, the at least one carbon nanostructure is at least one carbon nanotube drawn film. The at least one carbon nanotube drawn film is disposed in the plurality of copper ligaments. One part of the carbon nanotubes in the carbon nanotube drawn film are embedded in the plurality of the coper ligaments, and another part of the carbon nanotubes in the carbon nanotube drawn film are located in the plurality of pores, and/or the others part of the carbon nanotubes in the carbon nanotube drawn film are exposed from surface of the porous structure.

In one embodiment, the carbon nanostructure comprises at least one graphene film. The at least one graphene film is uniformly dispersed in the porous copper composite. The at least one graphene film is composed of a single layer of carbon atoms, and the single layer of carbon atoms is two-dimensionally dispersed. Therefore, the at least one graphene film can be coated on the surface of the plurality of copper ligaments, or embedded in the plurality of copper ligaments, or dispersed in the pores of the plurality of copper ligaments.

Another embodiment is described in relation to a method for making a current collector of the lithium ion battery. The method comprises steps of:

step (S10), providing a carbon nanostructure reinforced copper composite substrates, and disposing an active metal layer on a surface of the carbon nanostructure reinforced copper composite substrates to form a composite substrate;

step (S20), stacking at least two composite substrates to form a first a composite structure;

step (S30), pressing the first composite structure to form a second composite structure;

step (S40), annealing the second composite structure to form a third composite structure; and step (S50), dealloying the third composite structure to form a porous copper composite.

In the second embodiment, Steps (S30) to (S50) are similar as steps (S3) to (S5) of the first embodiment, and step (S10) and step (S20) are different from step (S1) and step (S2).

In step (S20), in one embodiment, the copper substrate and the active metal layer of two adjacent composite substrates are placed in contact with each other.

Before step (S10) after step (S20), further comprising the step of scraping the surfaces of the copper substrate and the active metal layer to expose fresh surface of the copper substrate and the active metal layer. An exposed fresh surface of the active metal layer is directly in contact with an exposed fresh surface of the copper substrate to make the bonding force between the copper substrate and the active metal layer stronger during subsequent pressing. In one embodiment, the copper substrate and the active metal layer are scraped with a metal brush, so that the exposed fresh surface of the active metal layer is directly in contact with the exposed fresh surface of the copper substrate.

One embodiment is described in relation to a method for making an anode electrode of a lithium ion battery. The method comprises steps of:

step (S21), providing at least two carbon nanostructure reinforced copper composite substrates, and stacking the at least two carbon nanostructure reinforced copper composite substrates to form a composite substrate, wherein the at least two carbon nanostructure reinforced copper composite substrates comprises a copper substrate and a carbon nanostructure, and a volume fraction of the carbon nanostructure in the composite substrate is greater than or equal to 40% and less than or equal to 70%;

step (S22), disposing an active metal layer on a surface of the composite substrate to form a first a composite structure;

step (S23), pressing the first composite structure to form a second composite structure;

step (S24), annealing the second composite structure to form a third composite structure; and step (S25), dealloying the third composite structure to form a porous copper composite.

Steps (S22) to (S250 in the method for making the anode of the lithium ion battery are the same as steps (S2) to (S5) in the method for making the current collector of the lithium ion battery, except that the volume fraction of the carbon nanostructure in the composite substrate is greater than or equal to 40% and less than or equal to 70% in step S21.

One embodiment of an anode electrode of a lithium ion battery prepared by the above method for making the anode electrode of the lithium ion battery is provided. The anode electrode of the lithium ion battery is a porous copper composite. The porous copper composite consists of a plurality of copper ligaments and at least one carbon nanostructure. A porous structure is formed by the plurality of copper ligaments, and the at least one carbon nanostructure is uniformly disposed in the plurality of copper ligaments. A volume fraction of the at least one carbon nanostructure in the porous copper composite is greater than or equal to 40% and less than or equal to 70%.

The porous copper composite has a three-dimensional network structure. The porous structure comprises a plurality of pores, and the plurality of copper ligaments are staggered to form the plurality of pores. The plurality of pores can be regularly dispersed or irregularly dispersed. Size of the plurality of pores range from about 30 nm to about 5 micrometers. The method of forming the plurality of pores is not limited.

The carbon nanostructure comprises at least one carbon nanotube film or at least one graphene film. When the carbon nanostructure comprises a plurality of carbon nanotube films, the adjacent two carbon nanotube films can be disposed in a coplanar or stacked. Additionally, an angle can exist between the orientation of carbon nanotubes in adjacent drawn films, stacked and/or coplanar. Adjacent drawn carbon nanotube films can be combined by only Van der Waals attractive forces therebetween without the need of an additional adhesive. An angle between the aligned directions of the carbon nanotubes in the two adjacent drawn carbon nanotube films can range from about 0 degrees to about 90 degrees. In one embodiment, the angle α is 0°. When the carbon nanostructure comprises a plurality of graphene films, the adjacent two graphene films can be disposed in a coplanar or stacked.

The carbon nanotube film can be a carbon nanotube drawn film, a carbon nanotube rolled film, and a carbon nanotube flocculated film. The at least one carbon nanotube film are embedded in the porous structure. One part of the carbon nanotubes in the carbon nanotube film are embedded in the plurality of the coper ligaments, and another part of the carbon nanotubes in the carbon nanotube film are located in the plurality of pores, and/or the others part of the carbon nanotubes in the carbon nanotube film are exposed from surface of the porous structure. In one embodiment, the carbon nanotube film is the carbon nanotube drawn film.

The carbon nanotube drawn film includes a plurality of carbon nanotubes that can be arranged substantially parallel to a surface of the carbon nanotube drawn film. A large number of the carbon nanotubes in the carbon nanotube drawn film can be oriented along a preferred orientation, meaning that a large number of the carbon nanotubes in the carbon nanotube drawn film are arranged substantially along the same direction. An end of one carbon nanotube is joined to another end of an adjacent carbon nanotube arranged substantially along the same direction by Van der Waals attractive force. A small number of the carbon nanotubes are randomly arranged in the carbon nanotube drawn film, and has a small if not negligible effect on the larger number of the carbon nanotubes in the carbon nanotube drawn film arranged substantially along the same direction.

The carbon nanotube film is capable of forming a free-standing structure. The term "free-standing structure" can be defined as a structure that does not have to be supported by a substrate. For example, a free standing structure can sustain the weight of itself when it is hoisted by a portion thereof without any significant damage to its structural integrity. So, if the carbon nanotube drawn film is placed between two separate supporters, a portion of the carbon nanotube drawn film, not in contact with the two supporters, would be suspended between the two supporters and yet maintain film structural integrity. The free-standing structure of the carbon nanotube drawn film is realized by the successive carbon nanotubes joined end to end by Van der Waals attractive force.

In one embodiment, the at least one carbon nanostructure is at least one carbon nanotube drawn film. The at least one carbon nanotube drawn film is disposed in the plurality of copper ligaments. One part of the carbon nanotubes in the carbon nanotube drawn film are embedded in the plurality of the coper ligaments, and another part of the carbon nanotubes in the carbon nanotube drawn film are located in the plurality of pores, and/or the others part of the carbon nanotubes in the carbon nanotube drawn film are exposed from surface of the porous structure. The volume fraction of the at least one carbon nanotube drawn film in the porous copper composite is 40%.

In one embodiment, the carbon nanostructure comprises at least one graphene film. The at least one graphene film is uniformly dispersed in the porous copper composite. The at least one graphene film is composed of a single layer of carbon atoms, and the single layer of carbon atoms is two-dimensionally dispersed. Therefore, the at least one graphene film can be coated on the surface of the plurality of copper ligaments, or embedded in the plurality of copper ligaments, or dispersed in the pores of the plurality of copper ligaments.

The anode electrode of a lithium ion battery is composed of the porous copper composite material having a carbon nanostructure. Therefore, the anode electrode not only has excellent electrical conductivity, but also has a high specific surface area to adsorb more lithium ions. The anode electrode of the lithium ion battery can effectively increase an intercalation amount of lithium ions, can improve the stability of a passivation film formed in the first lithium intercalation process, and has low selectivity to the electrolyte. In addition, the anode electrode of the lithium ion battery does not contain a binder, which not only can greatly reduce an internal resistance of the lithium ion battery, promote electron conduction, improve a conductivity of the lithium ion battery, and can effectively shorten an electron conduction path. The above factors are also beneficial to the improvement of the cycle performance of the lithium ion battery.

Embodiment 1

A copper film having a thickness of 0.5 μm is plated on a titanium substrate, and then a carbon nanotube drawn film is disposed on the surface of the copper film, and then the copper film is plated on the surface of the carbon nanotube film, and the above steps are repeated to form a composite substrate having a thickness of 25 micron. Firstly, the composite substrate is cleaned with hydrochloric acid to remove the oxide layer. Secondly, the composite substrate is degreased with pure water and alcohol. A zinc film is plated on the surface of the carbon nanotube drawn film, and then the titanium plate is removed to form a first composite structure. By controlling plating parameters, a copper-zinc atomic ratio of 35:65 is finally obtained in the first composite structure. The first composite structure is cleaned with pure water, and surfaces of the first composite structure is dried using nitrogen gas. A surface of the roll is cleaned before pressing the first composite structure. The surface of the roll is scrubbed with a soft, dust-free paper soaked with alcohol to completely remove impurities on the surface of the roll. After the roll cleaning operation is completed, the first composite structure is pressed by the roll to form a second composite structure, and the thickness of the second composite structure reduced to half of the thickness of the first composite structure. Then, edges of the second composite structure are trimmed by 1 mm. The second composite structure is formed by repeating the folding and pressing process 8 times. After each the folding and pressing process is completed, the edge of the composite structure is trimmed.

Figure 5:
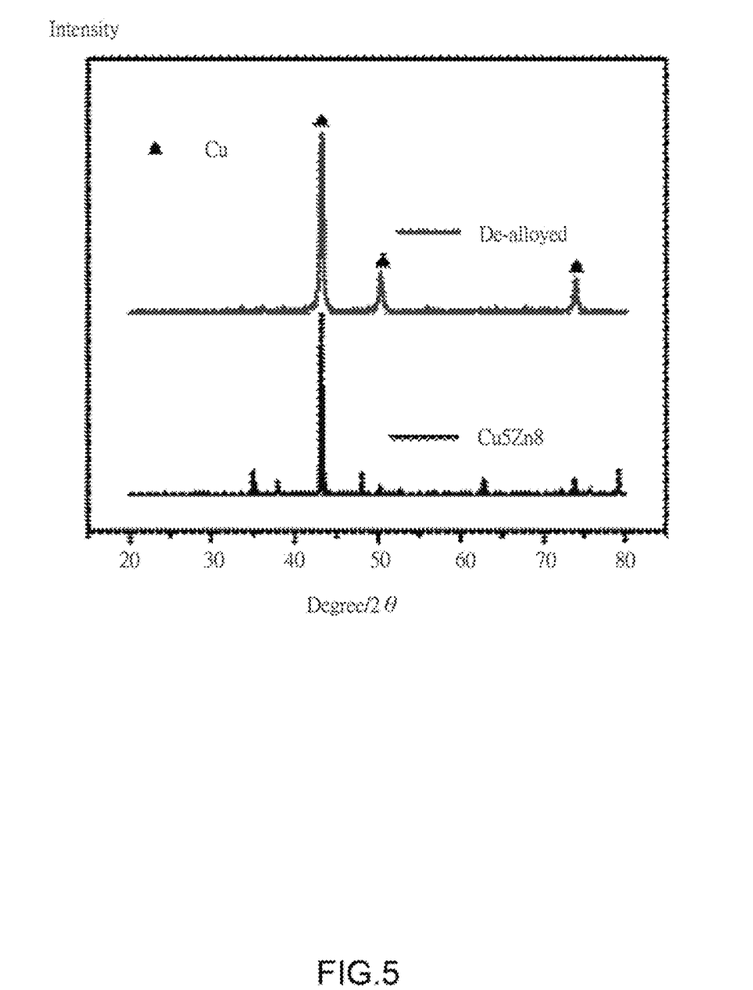
FIG. 5 is an X-Ray diffraction (XRD) pattern of one embodiment of a third composite structure before and after dealloying.
Figure 6:
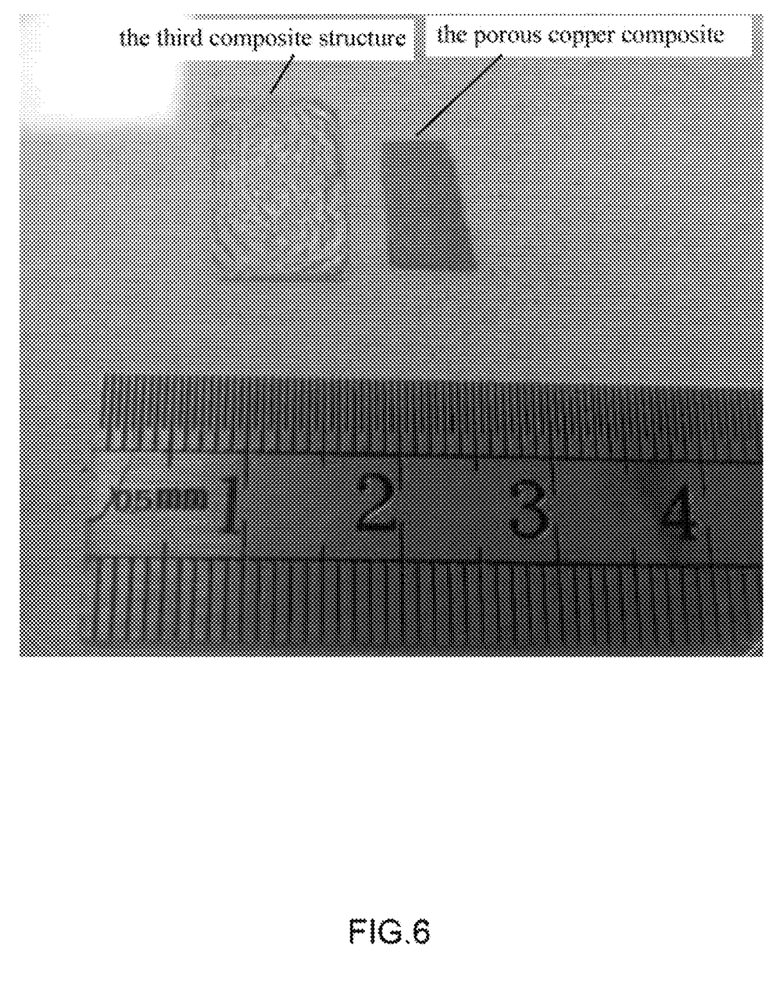
FIG. 6 is comparison image of one embodiment of the third composite structure and the porous copper composite.

The second composite structure is annealed in an argon atmosphere to obtain a third composite structure. An annealing temperature was 300° C., an annealing time was 24 hours, and an argon flow rate was set to 200 sccm. Since the copper-zinc atomic ratio is preset to 35:65, an alloy sample color is dark gray. As shown in an X-ray diffraction (XRD) pattern of FIG. 5, the obtained copper-zinc alloy in the third composite structure is a y phase. The third composite structure is de-alloyed to obtain a porous copper composite having a porous structure by an electrochemical method. A de-alloying system used is a three electrode system. A counter electrode is a platinum electrode, a reference electrode is a standard silver electrode, and a working electrode is the third composite structure. A corrosion potential is set to −0.2 V. After a period of dealloying the third composite structure, a corrosion current is close to 0 A, indicating that the active zinc component is completely removed, and finally the porous copper composite is obtained. As shown in FIG. 3, the carbon nanotube tubes are uniformly dispersed in the porous copper composite without agglomeration. The reason is that the carbon nanotubes are uniformly dispersed in the carbon nanotube film; on the other hand, the multiple pressing process is advantageous for achieving uniform dispersion of the carbon nanotubes in the porous copper composite. Therefore, the porous copper composite has a three-dimensional nanoporous structure, and the structure of the three-dimensional nanoporous structure is mainly determined by alloy composition and dealloying conditions.

A working electrode, a counter electrode, a separator and an electrolyte solution are assembled into a button battery. The porous copper composite is directly used as the working electrode of the lithium ion battery. The counter electrode is a pure metal lithium plate, the separator is a polymer material polyolefin porous film, and the electrolyte solution is made of ethylene carbonate (EC) and dimethyl carbonate (DMC). The volume ratio of ethylene carbonate (EC) and dimethyl carbonate (DMC) is 1:1.

Figure 7:
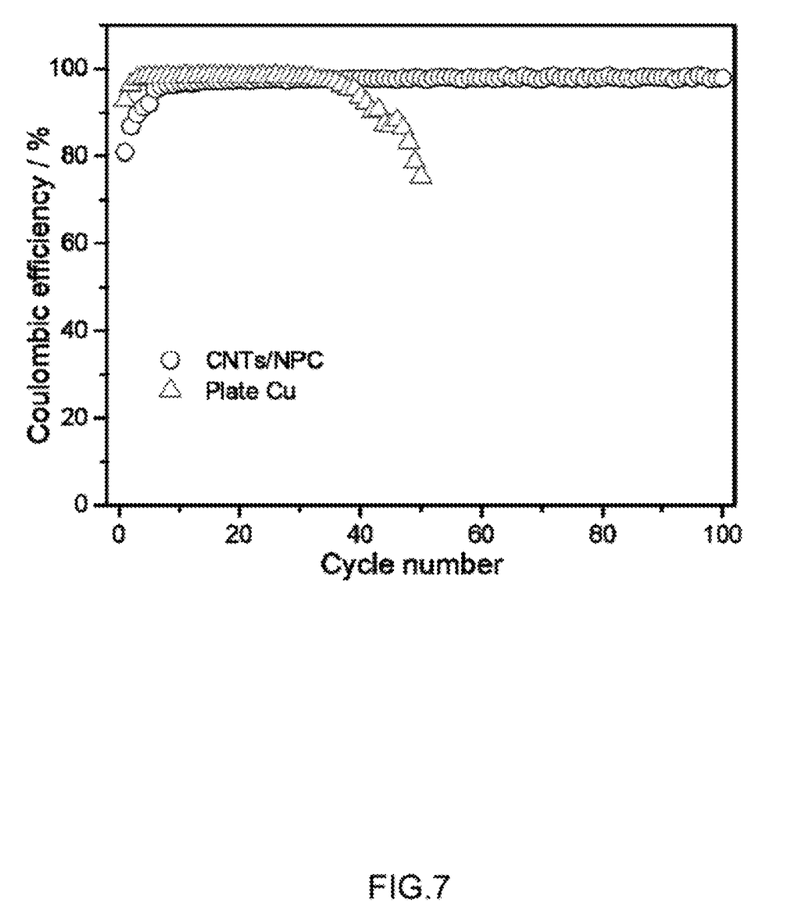
FIG. 7 is coulomb efficiency comparison image of one embodiment of a pure copper and the current collector of the lithium ion battery.

A coulombic efficiency test of the assembled button battery is performed under the condition that 1 mAh cm$^{-2}$ lithium metal is deposited on the working electrode at 0.5 mA cm$^{-2}$ constant current, then lithium ion is removed at 0.5 mA cm$^{-2}$ current, and a cutoff voltage is 1V. As shown in FIG. 7, when cycle times of the button battery is 100 times, a coulombic efficiency of the anode remains above 97%. It can be seen that the lithium ion battery has a good cycle performance.

The method for making a current collector and an anode electrode of a lithium ion battery has the following characteristics. Firstly, a variety of carbon nanostructure can be used as the reinforcing phase to form the current collector and the anode electrode of the lithium ion battery. Second, the method of making the current collector and the anode electrode is low cost, convenient and efficient and without complicated and expensive equipment. Third, the volume fraction of the carbon nanostructure in the current collector and the anode electrode can be adjusted by controlling the content of the carbon nanostructure in the first composite structure and the number of the process of pressing the second composite structure. Fourth, the dispersion of carbon nanostructures in the current collector and the anode electrode can be achieved by controlling the number of the process of pressing the second composite structure. Fifth, the carbon nanostructure partially covers the porous copper pore walls or copper ligament surfaces, and thus the carbon nanostructure will not hinder the intrinsic physicochemical properties of the porous copper.

The current collector and the anode electrode of the lithium ion battery has the following characteristics. Firstly, the current collector and the anode electrode comprises at least one carbon nanotube structure, and current collector and the anode electrode have good electrical conductivity, toughness and stability due to good mechanical strength, toughness and electrical conductivity of the carbon nanotube structure. Second, the current collector has a porous structure, at least one carbon nanotube structure is uniformly dispersed in the current collector, which is favorable for uniform dispersion of lithium ions, promotes electron conduction, improves the conductivity of the lithium ion battery, and can effectively shorten the electron conduction path. The above factors are also beneficial to the improvement of the cycle performance of the lithium ion battery.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

Depending on the embodiment, certain of the steps of methods described may be removed, others may be added, and the sequence of steps may be altered. It is also to be understood that the description and the claims drawn to a method may comprise some indication in reference to certain steps. However, the indication used is only to be viewed for identification purposes and not as a suggestion as to an order for the steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will, therefore, be appreciated that the embodiments described above may be modified within the scope of the claims.

What is claimed is:

1. A method for making an anode electrode of a lithium ion battery, comprising:
    S10, providing at least two carbon nanostructure reinforced copper substrates, and stacking the at least two carbon nanostructure reinforced copper substrates to form a first composite substrate, wherein the at least two carbon nanostructure reinforced copper substrates comprises a copper substrate and a carbon nanostructure, and a volume fraction of the carbon nanostructure in the composite substrate is greater than or equal to 40% and less than or equal to 70%;
    S20, disposing an active metal layer on a surface of the first composite substrate to form a second composite structure;
    S30, pressing the second composite structure to form a third composite structure;
    S40, annealing the third composite structure to form a forth composite structure; and
    S50, dealloying the forth composite structure to form a porous copper composite.

2. The method of claim 1, wherein the carbon nanostructure comprises at least one carbon nanotube film or at least one graphene film in step S10.

3. The method of claim 2, wherein in step S30, further comprising a process of alternatively folding and pressing the third composite structure.

4. The method of claim 3, wherein in each folding and pressing process, a thickness of the first composite structure after pressing is decreased to less than 70% of a thickness of the first composite structure after folding.

5. The method of claim 1, wherein before step S20, further comprises a step of degreasing the first composite substrate.

6. The method of claim 1, wherein after step S30 and before step S40, further comprises a step of trimming edges of the second composite structure.

7. The method of claim 1, wherein the copper substrate and the carbon nanostructure are directly in contact with each other in the composite substrate in S10.

8. The method of claim 1, wherein after step S30 and before step S40, further comprises a step of trimming edges of the second composite structure.

9. The method of claim 1, wherein the carbon nanostructure comprises at least one carbon nanotube drawn film, the carbon nanotube drawn film comprises a plurality of carbon nanotubes, and the plurality of carbon nanotubes are joined end to end and arranged substantially along a same direction.

* * * * *